US008224360B2

(12) United States Patent
Hwang et al.

(10) Patent No.: US 8,224,360 B2
(45) Date of Patent: Jul. 17, 2012

(54) SYSTEM AND METHOD FOR HANDLING SPECIAL NUMBER CALLS USING TEXT MESSAGE FORMAT

(75) Inventors: Kuen-Yih Hwang, Naperville, IL (US); John Lawrence Snapp, Westminster, CO (US); Michael Arthur Koepke, Geneva, IL (US)

(73) Assignee: West Corporation, Omaha, NE (US)

( * ) Notice: Subject to any disclaimer, the term of this patent is extended or adjusted under 35 U.S.C. 154(b) by 692 days.

(21) Appl. No.: 11/953,159

(22) Filed: Dec. 10, 2007

(65) Prior Publication Data
US 2009/0147928 A1 Jun. 11, 2009

(51) Int. Cl.
*H04W 4/00* (2009.01)
(52) U.S. Cl. .................. 455/466; 455/404.1; 455/414.1; 455/402.2; 379/111
(58) Field of Classification Search ............... 455/404.1, 455/414.1; 379/111, 45, 37
See application file for complete search history.

(56) References Cited

U.S. PATENT DOCUMENTS

| | | | | |
|---|---|---|---|---|
| 5,937,355 | A * | 8/1999 | Joong et al. ............... | 455/466 |
| 6,233,445 | B1 | 5/2001 | Boltz et al. | |
| 6,636,732 | B1 * | 10/2003 | Boling et al. ............... | 455/404.1 |
| 7,801,539 | B2 * | 9/2010 | Murtagh et al. ............... | 455/466 |
| 2002/0086659 | A1 | 7/2002 | Lauper | |
| 2003/0012344 | A1 | 1/2003 | Agarwal et al. | |
| 2003/0109245 | A1 * | 6/2003 | McCalmont et al. ......... | 455/404 |
| 2004/0105529 | A1 * | 6/2004 | Salvucci et al. ................. | 379/45 |
| 2004/0192271 | A1 * | 9/2004 | Eisner et al. ................. | 455/414.1 |
| 2004/0203569 | A1 * | 10/2004 | Jijina et al. .................. | 455/404.1 |
| 2005/0053209 | A1 * | 3/2005 | D'Evelyn et al. ............. | 379/111 |
| 2005/0197112 | A1 | 9/2005 | Yang et al. | |
| 2005/0221851 | A1 * | 10/2005 | Grivas et al. .................. | 455/518 |
| 2007/0117577 | A1 * | 5/2007 | Harris ........................... | 455/466 |
| 2007/0202927 | A1 * | 8/2007 | Pfleging et al. ............... | 455/567 |
| 2007/0286181 | A1 * | 12/2007 | Bushmitch et al. ........... | 370/356 |

* cited by examiner

*Primary Examiner* — Anthony Addy
*Assistant Examiner* — Shahriar Behnamian

(57) ABSTRACT

A system for handling special number calls placed from a calling instrument using a text messaging format includes: a plurality of message handling units configured in at least one communication network accessible by the calling instrument. At least one selected message handling unit of the plurality of message handling units operates to recognize an extant call placed from the calling instrument using a special number and expressed in the text messaging call format. The plurality of message handling units cooperates to effect querying the calling instrument to ascertain a substantially pinpoint geographic location of the calling instrument substantially contemporaneously with the extant call. The plurality of message handling units cooperates to use the geographic location for routing the extant call to at least one selected special number answering station coupled with the at least one communication network and situated generally proximate with the geographic location.

20 Claims, 3 Drawing Sheets

SYSTEM AND METHOD FOR HANDLING SPECIAL NUMBER CALLS USING TEXT MESSAGE FORMAT

FIELD OF THE INVENTION

The present invention is directed to telecommunication systems, and especially to handling special number calls using text message format.

BACKGROUND OF THE INVENTION

Special number services such as, by way of example and not by way of limitation, the Emergency Service E9-1-1 network in the United States, were implemented primarily in a voice network. The relatively recent introduction of text message (also referred to as text messaging) formats conveyed via voice networks has provided additional capabilities for the E9-1-1 network as well as other special number networks. For example, deaf persons may access the E9-1-1 network using a text messaging format without special equipment or connections to a special network. Similarly, when a calling station is unattended (e.g., a mobile station such as an ACN (Automatic Collision Notification) system), an emergency notification message may be automatically provided via a network in a text messaging format.

Text messaging communication may employ a format such as Short Message Service (SMS) or Unstructured Supplementary Service Data (USSD) and may be conveyed using control channels or other communication channels associated with a telecommunication network. By way of example and not by way of limitation, telecommunication networks may employ various types of signaling in various channels of communication to effect the desired routing, connection, packetizing and other functions associated with carrying out desired communications. By way of example and not by way of limitation, a switching protocol known as Signaling System-7 (SS-7) may be employed for supporting such network functions as call-establishment, billing, routing, and information exchange functions in a Public Switched Telephone Network (PSTN). SS-7 may identify functions to be performed by a signaling system PSTN and a protocol to enable performance of the identified functions. SS-7 may be used to support communications using a text messaging format.

Text messaging formats, such as, by way of example and not by way of limitation, SMS format, permit transmission of alphanumeric messages between a mobile subscriber and external systems such as electronic mail, paging, voice mail systems and special number systems (e.g., Emergency Service Systems). To date, there has not been a "marriage" of special number dialing and text message format messages. That is, until now one who desired to communicate with a special number system, such as an Emergency Service system, using a test messaging format had to dial a seven- or ten-digit number to reach a responsive entity. For example, one would have to dial a seven- or ten-digit number to reach a Public Safety Answering Position (PSAP; sometimes referred to as a Public Safety Answering Point) using a text messaging format in order to report an emergency situation requiring assistance. One could not dial a shortened calling number when employing a text messaging format to reach a PSAP, such as by way of example and not by way of limitation dialing "9-1-1".

Further, special number calling systems have originated and developed based upon an assumption that the origination locus of a special number call is known prior to the initiation of the call. This presumption has traditionally been correct because the specific address and location at an address is associated with every telephone number that supports fully capable special number calling.

Known location information is preferably used to route E9-1-1 calls to an appropriate PSAP near the origin of the call. The same information may be used by the PSAP to support the emergency response to the call, such as dispatching fire, police or emergency medical personnel and equipment and for call back to the call originator if necessary. However, origin of a special number call is often not known when the call is placed using a mobile phone.

If location information relating to a mobile phone provides only coarse mobile network cell-level granularity to an E9-1-1 PSAP, police or emergency service personnel may go to a location indicated for a particular phone number and find that they have arrived at a large office building or at a widespread college campus with no means available for locating the caller with greater accuracy. Valuable time may be spent in finding the particular locus of the caller to render the required assistance. Such delays can be life threatening in the case of emergency service calls.

Location technologies have more recently been developed, such as GPS (Global Positioning Satellite) technology to assist in locating mobile phones. However, to date there has been no "marriage" of locating technology with special number calling using text messaging format. That is, no system or method has been available to user so far permitting conveyance of location information from a mobile caller to a called party when using a text messaging format.

There is a need for a system and method for handling special number calls using a text message format that recognizes a shortened calling number.

There is a need for a system and method for handling special number calls using a text message format that can provide location information relating to the calling party.

SUMMARY OF THE INVENTION

A system for handling special number calls placed from a calling instrument using a text messaging format includes a plurality of message handling units configured in at least one communication network accessible by the calling instrument. At least one selected message handling unit of the plurality of message handling units operates to recognize an extant call placed from the calling instrument using a special number and expressed in the text messaging call format. The plurality of message handling units cooperates to effect querying the calling instrument to ascertain a substantially pinpoint geographic location of the calling instrument substantially contemporaneously with the extant call. The plurality of message handling units cooperates to use the geographic location for routing the extant call to at least one selected special number answering station coupled with the at least one communication network and situated generally proximate with the geographic location.

A method for handling special number calls placed from a calling instrument using a text messaging format; the method includes: (a) providing a plurality of message handling units; (b) coupling the plurality of message handling units in at least one communication network accessible by the calling instrument; (c) operating at least one selected message handling unit of the plurality of message handling units to recognize an extant call placed from the calling instrument in the text messaging call format using a special number; (d) operating the plurality of message handling units cooperatively to effect querying the calling instrument to ascertain a substantially pinpoint geographic location of the calling instrument substantially contemporaneously with the extant call; and (e) operating the plurality of message handling units cooperatively to use the geographic location for routing the extant call to at least one selected special number answering station coupled with the at least one communication network and situated generally proximate with the geographic location.

It is, therefore a feature of the present invention to provide a system and method for handling special number calls using a text message format that recognizes a shortened calling number.

It is another feature of the present invention to provide a system and method for handling special number calls using a text message format that can provide location information relating to the calling party.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

For purposes of illustration, by way of example and not by way of limitation, the present invention will be discussed in the context of an emergency service network in the United States, commonly referred to as an E9-1-1 network. The teachings of the present invention are equally applicable, useful and novel in other special number calling systems, such as maintenance service networks, college campus security networks and other networks.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
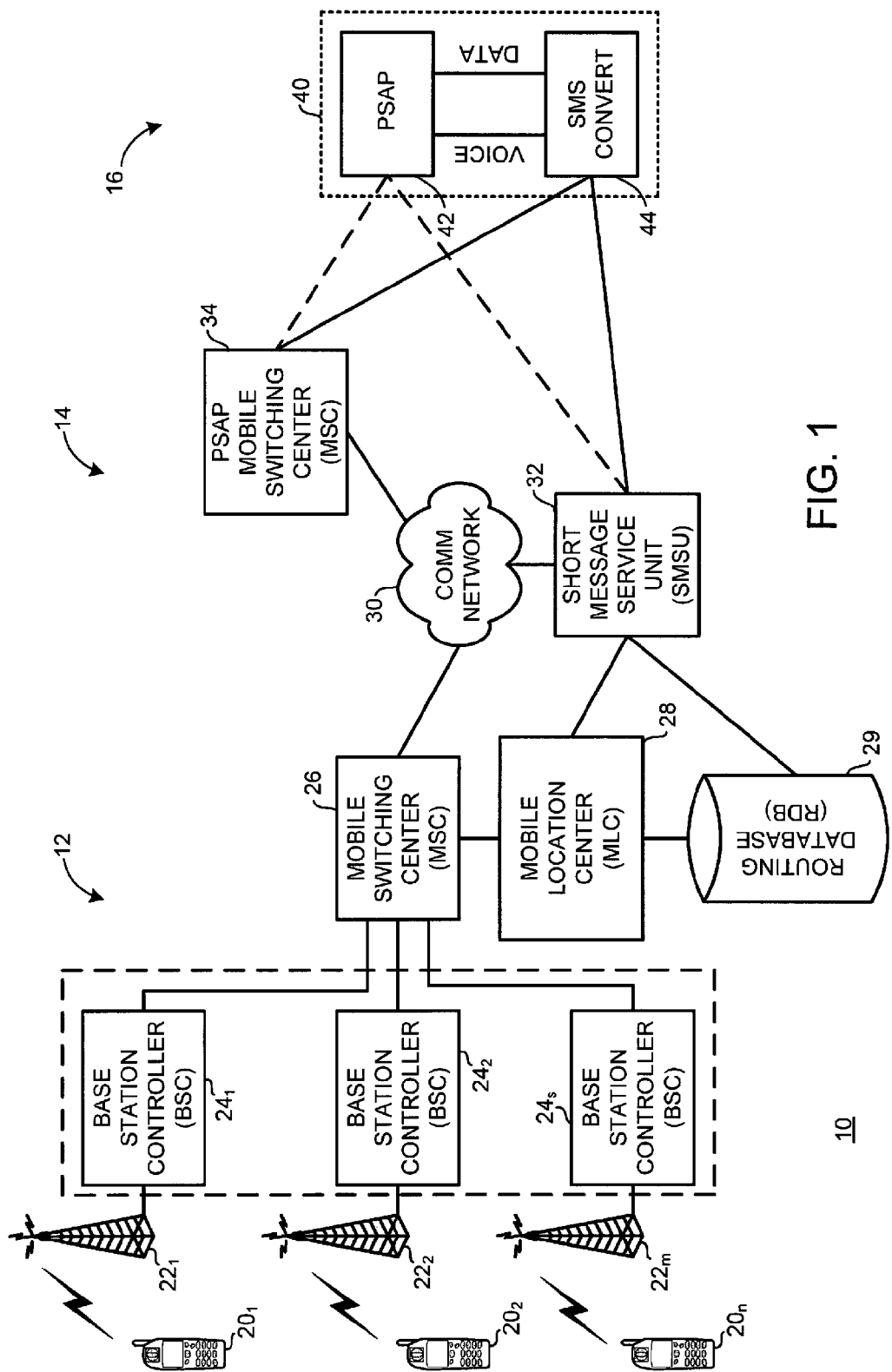
FIG. 1 is a schematic diagram illustrating a system for handling special number calls using a text message format.

FIG. 1 is a schematic diagram illustrating a system for handling special number calls using a text message format. In FIG. 1, a system 10 for handling wireless special number calls, such as wireless Emergency Service E9-1-1 calls, includes an originating wireless network section 12, a location server section 14 and a location client section 16.

Originating wireless network section 12 includes a plurality of wireless phones $20_1$, $20_2$, $20_n$ in communication with a plurality of wireless communication antennas $22_1$, $22_2$, $22_m$ and an associated plurality of Base Station Controllers (BSC) $24_1$, $24_2$, $24_s$. Wireless network 12 may be implemented in any configuration using any protocol or standard. In a preferred embodiment, wireless network 12 is implemented according to the Global System for Mobile Communications (GSM; also sometimes referred to as Groupe Speciale Mobile) standard. The indicators "n", "m" and "s" are employed to signify that there can be any number of wireless phones, wireless communication antennas and BSCs in originating wireless network section 10. The inclusion of three wireless phones $20_1$, $20_2$, $20_n$; three wireless communication antennas $22_1$, $22_2$, $22_m$ and three BSCs $24_1$, $24_2$, $24_s$ in FIG. 1 is illustrative only and does not constitute any limitation regarding the number of wireless phones, wireless communication antennas and BSCs that may be included in an originating wireless network section 10 in the present invention. Moreover, it is not required that the numbers of wireless phones, wireless communication antennas and BSCs be equal.

Originating wireless network section 12 also includes at least one Mobile Switching Center (MSC) 26 coupled with base station controllers (BSC) $24_1$, $24_2$, $24_s$. A Mobile Location Center (MLC) 28 and a Routing Data Base (RDB) 29 are coupled with MSC 26 for use by MSC 26 in determining location of a respective wireless phone $20_n$.

MLC 28 preferably embodies functions performed by other units known by those skilled in the art of telecommunication networks such as, by way of example and not by way of limitation, a Serving Mobile Location Center (SMLC), Position Determining Entity (PDE), a Gateway Mobile Location Center (GMLC), a Mobile Positioning Center (MPC), a Home Location Register (HLR) and a Visitors' Location Register (VLR).

Location server section 14 includes a communication network 30 coupled with MSC 26, a Short Message Service Unit (SMSU) 32 coupled with communication network 30 and a PSAP Mobile Switching Center (MSC) 34 coupled with communication network 30. In preferred embodiment, SMSU 32 is coupled with MLC 28 and with RDB 29 for directly receiving location information and routing information. SMSU 32 embodies functions performed by other units known by those skilled in the art of telecommunication networks such as, by way of example and not by way of limitation, a Short Message Service Center (SMSC), a Gateway Mobile Location Center (GMLC) and a Mobile Positioning Center (MPC). SMSU 32 is configured for recognizing and supporting special number SMS communications such as, by way of example and not by way of limitation, emergency service E9-1-1 communications.

Location client section 16 includes a public safety answering unit 40. Public safety answering unit 40 includes a PSAP 42 configured for handling emergency Short Message Service (SMS) communications and coupled with MSC 34. Alternatively, PSAP 42 may not be configured for handling SMS communications, and public service answering unit 40 may also include an SMS converting unit 42 coupled with PSAP 42 for converting SMS communications to voice or data communications, or both voice and data communications, or voice format and visual format communications for use by PSAP 42. SMS converting unit 44 is coupled with MSC 34 when installed. Location client section 16 is configured with PSAP 40 coupled with MSC 34 for voice communications (indicated by a broken line in FIG. 1) and with SMS converting unit 44 coupled with MSC 34 for SMS communications (indicated by a solid line in FIG. 1).

MSC 34 is configured in a manner similar to configuration of MSC 26 and coupled for serving public safety answering unit 40. MSC 34 is also coupled for serving communication stations or units other than public safety answering unit 40.

A particular wireless phone $20_n$ may thus establish a call route traversing system 10 via an antenna $22_m$ and associated BSC $24_s$ via MSC 26, communication network 30 and MSC 34 to public safety answering unit 40. For PSAP 42 not configured for handling emergency SMS communications, SMS converting unit 44 may be included in a call route leading to PSAP 42.

Alternatively, a call route may be established from communication network 30 to PSAP 42 via SMSU 32, as indicated by a connection between SMSU 32 and PSAP 42 in a broken line format. Further, a call route may be established from communication network 30 to PSAP 42 via SMS converting unit 44 if PSAP 42 is not configured for handling emergency SMS communications. By way of example and not by way of limitation, communications between SMSU 32 and public safety answering unit 40 (i.e., either or both of PSAP 42 and SMS converting unit 44) may be carried out using Internet Protocol (IP) communications.

PSAP 42 may be embodied in a mobile handset (similar to a wireless phone $20_n$). In such an arrangement, one or more antenna (similar to antenna $22_m$) and BSC (similar to BSC $24_s$) may, by way of example and not by way of limitation, be included in a call route between MSC 34 and public safety answering unit 40. Employment of such additional participating elements in call routing will be understood by one skilled in the art of special number communication system design. Such additional elements are not included in FIG. 1 so as to avoid cluttering FIG. 1.

Figure 2:
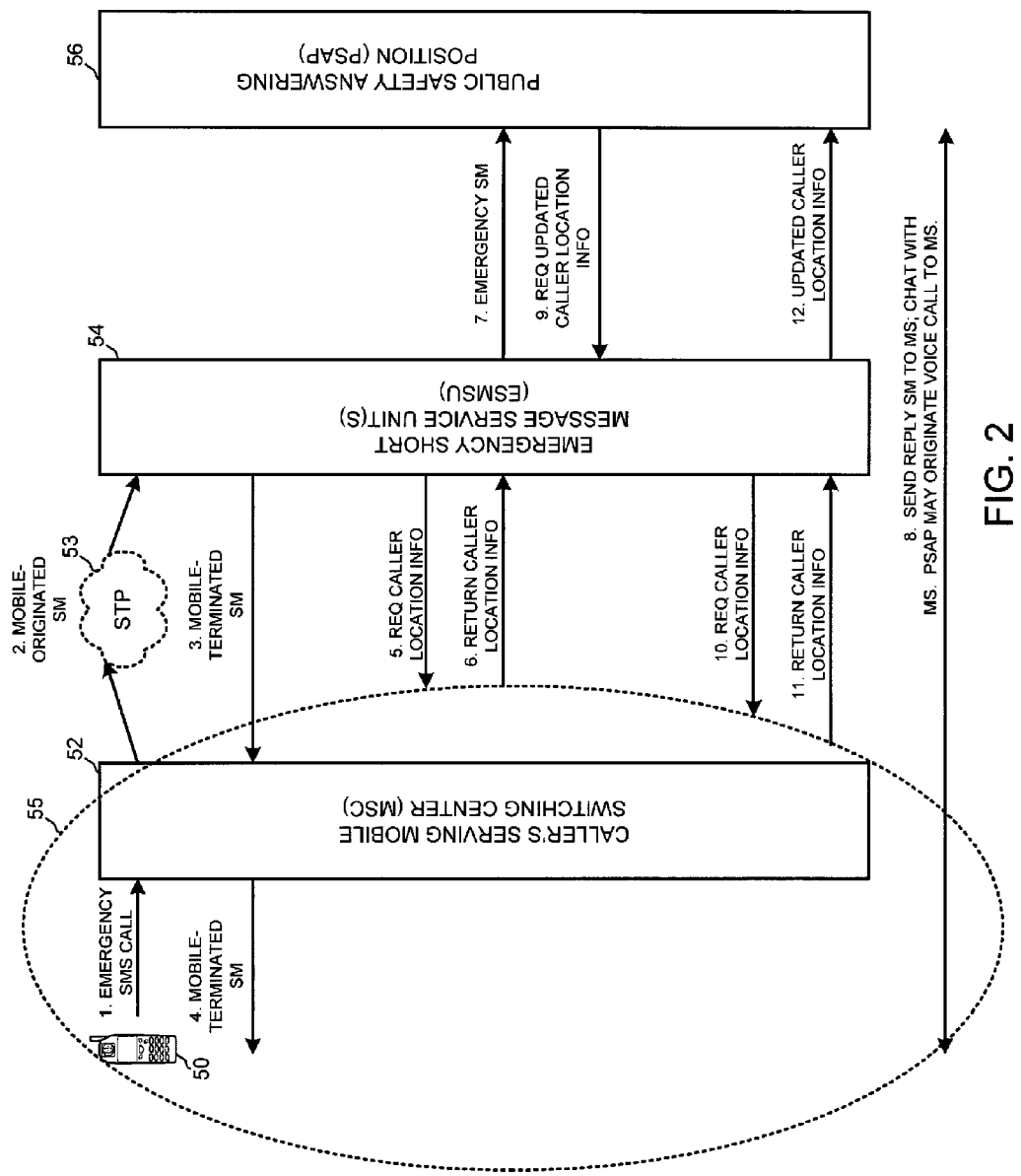
FIG. 2 is a schematic diagram illustrating representative call flows that may be employed with the system illustrated in FIG. 1.

FIG. 2 is a schematic diagram illustrating representative call flows that may be employed with the system illustrated in FIG. 1. In FIG. 2, a mobile communication unit 50 places an emergency service Short Message Service (SMS) call, indicated as step #1, to a mobile switching center (MSC) 52. MSC 52 places a Mobile Originated Short Message (MO-SM) call to at least one Emergency Short Message Service Unit(s) (ESMSU) 54, indicated as step #2. Any call between MSC 52 and ESMSU 54 (including calls involved in steps 3, 5, 6, 10, 11, and 8, described below) may be placed via one or more Signal Transfer Points, indicated in FIG. 2 by an STP 53. The optional nature of participation by an STP in calls represented in FIG. 2 is indicated by depicting STP 53 using a dotted line format.

ESMSU 54 then establishes a Mobile Terminated Short Message (MT-SM) communication channel with MSC 52 (indicated as step #3) and MSC 32 establishes a Mobile Terminated Short Message (MT-SM) communication channel with mobile communication unit 50 (indicated as step #4. The MT-SM established by step #4 supports SM communications with mobile communication unit 50.

ESMSU 54 thereafter requests location information relating to the caller (i.e., mobile communication unit 50) of the originating wireless network 55 (e.g., See FIG. 1; originating wireless network 12) using whatever location technology may be supported by the extant originating wireless network 55 (indicated as step #5. It is preferred that the most accurate location information available be obtained. MSC 52 provides location information to ESMSU 54 (indicated as step #6).

ESMSU 54 thereafter provides the emergency MO-SM received from mobile communication unit 50 (step #1) to a Public Safety Answering Position (PSAP) 56 accompanied by location information relating to position of the originating caller at mobile communication unit 50 (indicated as step #7). In an embodiment of the invention, step #7 includes the emergency MO-SM received from mobile communication unit 50 plus pinpoint geographic information, such as geocoordinate location (e.g., X/Y or X/Y/Z coordinates) or Global Positioning System (GPS) location information or coarse wireless cell level location information. More than one format of location information may accompany step #7, if desired.

Which respective PSAP 56 is selected for receiving the Emergency MO-SM is determined by an MSC using location information received via step #6 in order to effect routing the Emergency MO-SM to a PSAP proximate to the location of the mobile communication unit 50 that originated the emergency services call.

PSAP 56 sends a reply Short Message (SM) to mobile communication unit 50 and engages in an SM chat session (i.e., two-way duplex or half-duplex SM communication) with a caller using mobile communication unit 50. PSAP 56 cooperates with ESMSU 54 and MSC 52 to establish the necessary communication channels for carrying out the SM communications represented by step #8. Communication channels established pursuant to effecting steps #5 and #6 are employed in establishing channels required for effecting step #8, if desired.

PSAP 56 updates location information pertaining to mobile communication unit 50 by placing a request for updated caller location information, as indicated by a step #9. In response to such a request for updated location information, ESMSU54 requests location information relating to the caller (i.e., mobile communication unit 50) of the originating wireless network (e.g., See FIG. 1; originating wireless network 12) using whatever location technology may be supported by the extant network (indicated as step #10). It is preferred that the most accurate location information available be obtained. MSC 52 provides location information to ESMSU 54 (indicated as step #11). Updated location information is thereafter provided by ESMSU 54 to PSAP 56, as indicated by a step #12. The step sequence #9-#12 is repeated as often as desired or necessary to keep PSAP 56 apprised of the position of mobile communication unit 50.

It may be desirable to ensure that subsequent SM communications following step #1 (original emergency SM call) continue with PSAP 56 so that all SM communications sent from a particular caller may be routed to the same PSAP 56, even if the caller may move. Such continuing communications may occur during the chat session that may be established in indicated step #8. Because SMS communications do not provide an indication of "end call", it may be desirable to provide an indication that an emergency has ended. One indication of "end call" may involve designating a predetermined fixed time period between communication sessions or between succeeding SMs. By way of example and not by way of limitation, if a subsequent SM is sent more than 24 hours after a previous SM, the subsequent SM is considered as related to a new emergency situation. In such a situation, if mobile calling unit 50 has moved, a new PSAP may be assigned to the same emergency caller-mobile communication unit 50 based on the new location.

A Mobile Location Center (MLC) (see, e.g., MLC 28; FIG. 1) and a Routing Data Base (RDB) (see, e.g., RDB 29; FIG. 1) may be coupled with MSC 52 for use by MSC 52 in determining location of a respective wireless communication unit 50.

An MLC coupled with MSC 52 preferably embodies functions performed by other units known by those skilled in the art of telecommunication networks such as, by way of example and not by way of limitation, a Serving Mobile Location Center (SMLC), Position Determining Entity (PDE), a Gateway Mobile Location Center (GMLC), a Mobile Positioning Center (MPC), a Home Location Register (HLR) and a Visitors' Location Register (VLR).

Emergency Short Message Service Unit (ESMSU) 54 embodies functions performed by other units known by those skilled in the art of telecommunication networks such as, by way of example and not by way of limitation, a Short Message Service Center (SMSC), a Gateway Mobile Location Center (GMLC) and a Mobile Positioning Center (MPC). ESMSU 54 is configured for recognizing and supporting special number SMS communications such as, by way of example and not by way of limitation, emergency service E9-1-1 communications.

Any portions or associated elements of ESMSU 54 and MSC 52 may be employed alone or in combination to participate in determining location of mobile communication unit 50 to aid in selecting a particular PSAP 56 to which to route the MO-SM communication (step #2). It is important to select a PSAP 56 located as proximate to location of mobile communication unit 50 as feasible so as to accommodate rapid response of emergency service personnel to the reported emergency.

Figure 3:
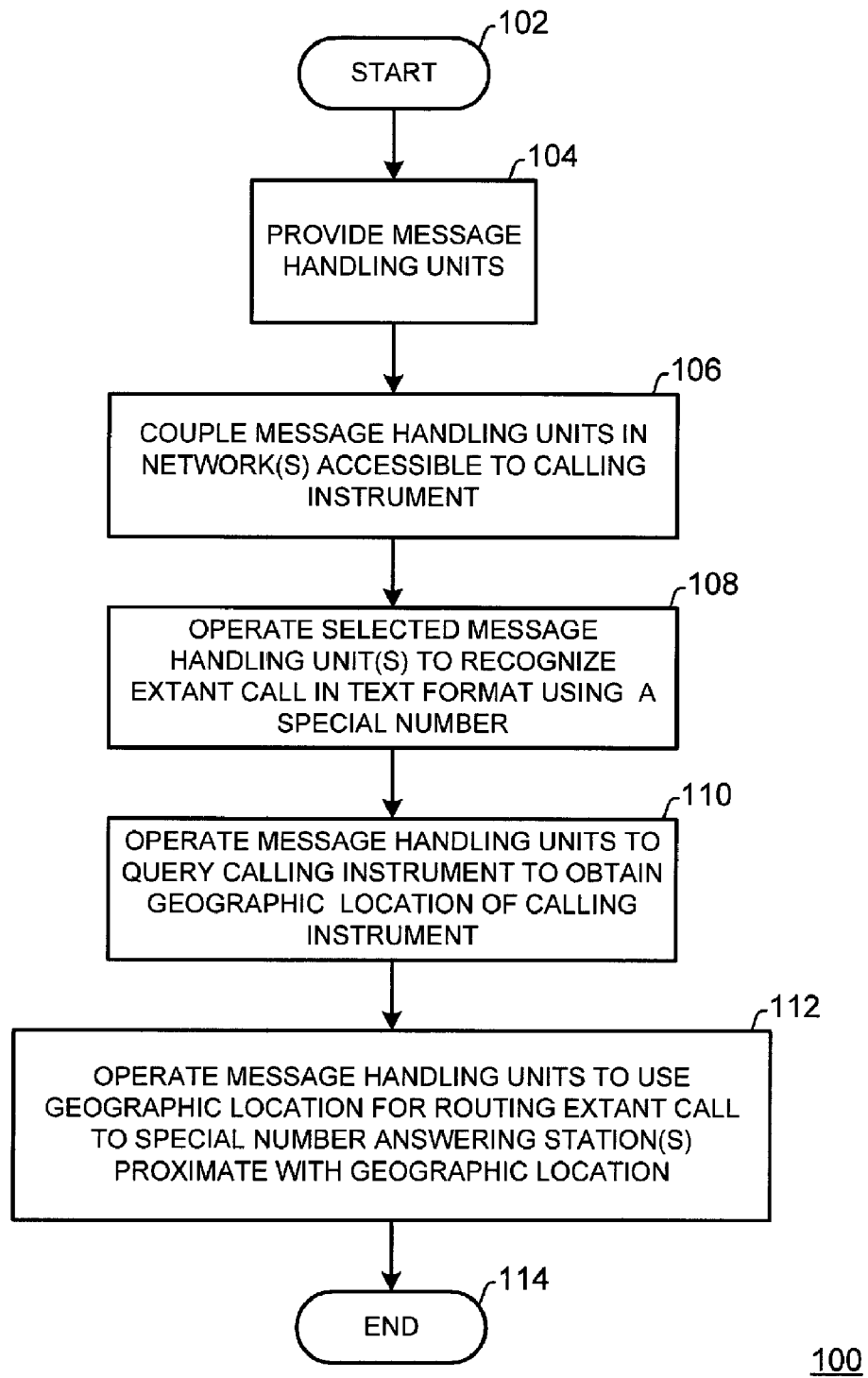
FIG. 3 is a flow diagram illustrating a method for handling special number calls using a text message format.

FIG. 3 is a flow diagram illustrating a method for handling special number calls using a text message format. In FIG. 3, a method 100 for handling special number calls placed from a calling instrument using a text messaging format begins at a START locus 102. Method 100 continues with providing a plurality of message handling units, as indicated by a block 104.

Method 100 continues with coupling the plurality of message handling units in at least one communication network accessible by the calling instrument, as indicated by a block 106.

Method 100 continues with operating at least one selected message handling unit of the plurality of message handling units to recognize an extant call placed from the calling instrument in the text messaging call format using a special number, as indicated by a block 108.

Method 100 continues with operating the plurality of message handling units cooperatively to effect querying the calling instrument to ascertain a substantially pinpoint geographic location of the calling instrument substantially contemporaneously with the extant call, as indicated by a block 110.

Method 100 continues with operating the plurality of message handling units cooperatively to use the geographic location for routing the extant call to at least one selected special number answering station coupled with the at least one communication network and situated generally proximate with the geographic location, as indicated by a block 112. Method 100 terminates at an END locus 114.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims:

The invention claimed is:

1. A system for handling special number calls placed from a calling instrument using a text messaging format; the system comprising: a plurality of message handling units configured in at least one communication network accessible by said calling instrument; at least one selected message handling unit of said plurality of message handling units operating to recognize and receive an extant call placed from said calling instrument in said text messaging call format using a special number via a first communication channel; said at least one selected message handling unit establishing a second communication channel with said calling unit for supporting text messaging communications; said plurality of message handling units cooperating to effect querying said at least one communication network to ascertain a geographic location of said calling instrument substantially contemporaneously with said extant call; and said plurality of message handling units cooperating to use said geographic location for routing said extant call to at least one selected special number answering station coupled with said at least one communication network and situated generally proximate with said geographic location; said at least one selected special number answering station cooperating with said plurality of message handling units to establish two-way chat session communications between said calling instrument and said at least one selected special number answering station in said text messaging call format using said first communication channel and said second communication channel.

2. A system for handling special number calls placed from a calling instrument using a text messaging format as recited in claim 1 wherein said geographic location is provided to said at least one selected special number answering station substantially contemporaneously with said extant call.

3. A system for handling special number calls placed from a calling instrument using a text messaging format as recited in claim 1 wherein said at least one selected special number answering station is configured for cooperating with said plurality of message handling units after receiving said extant call for initiating a query to said calling instrument for updating said geographic location.

4. A system for handling special number calls placed from a calling instrument using a text messaging format as recited in claim 1 wherein said at least one communication network includes at least one converting unit coupled with at least one call route established between said calling instrument and said at least one selected special number answering station using selected message handling units of said plurality of message handling units; said at least one converting unit effecting conversion of calls from said text messaging format to at least one of an audio format and a visual format.

5. A system for handling special number calls placed from a calling instrument using a text messaging format as recited in claim 4 wherein said geographic location is provided to said at least one selected special number answering station substantially contemporaneously with said extant call.

6. A system for handling special number calls placed from a calling instrument using a text messaging format as recited in claim 4 wherein said at least one selected special number answering station is configured for cooperating with said plurality of message handling units after receiving said extant call for initiating a query to said calling instrument for updating said geographic location.

7. A system for handling special number calls placed from a calling instrument using a text messaging format as recited in claim 5 wherein said at least one selected special number answering station is configured for cooperating with said plurality of message handling units after receiving said extant call for initiating a query to said calling instrument for updating said geographic location.

8. A system for handling emergency service calls placed from a calling instrument using a text messaging format; the system comprising: a plurality of message handling units configured in at least one communication network accessible by said calling instrument; at least one selected message handling unit of said plurality of message handling units operating to recognize and receive an extant call placed from said calling instrument in said text messaging call format using an emergency service number via a first communication channel; said at least one selected message handling unit establishing a second communication channel with said calling unit for supporting text messaging communications; said plurality of message handling units cooperating to effect querying said at least one communication network to ascertain a geographic location of said calling instrument substantially contemporaneously with said extant call; and said plurality of message handling units cooperating to use said geographic location for routing said extant call to at least one selected public service answering position coupled with said at least one communication network and situated generally proximate with said geographic location; said at least one selected special number answering station cooperating with said plurality of message handling units to establish two-way chat session communications between said calling instrument and said at least one selected public service answering position in said text messaging call format using said first communication channel and said second communication channel.

9. A system for handling emergency service calls placed from a calling instrument using a text messaging format as recited in claim 8 wherein said geographic location is provided to said at least one selected public safety answering position substantially contemporaneously with said extant call.

10. A system for handling emergency service calls placed from a calling instrument using a text messaging call format as recited in claim 8 wherein said at least one selected public safety answering position is configured for cooperating with said plurality of message handling units after receiving said extant call for initiating a query to said calling instrument for updating said geographic location.

11. A system for handling emergency service calls placed from a calling instrument using a text messaging call format as recited in claim 8 wherein said at least one communication network includes at least one converting unit coupled with at least one call route established between said calling instrument and said at least one selected public safety answering position using selected message handling units of said plurality of message handling units; said at least one converting unit effecting conversion of calls from said text messaging format to at least one of an audio format and a visual format.

12. A system for handling emergency service calls placed from a calling instrument using a text messaging call format as recited in claim 11 wherein said geographic location is provided to said at least one selected public safety answering position substantially contemporaneously with said extant call.

13. A system for handling emergency service calls placed from a calling instrument using a text messaging call format as recited in claim 11 wherein said at least one selected public safety answering position is configured for cooperating with said plurality of message handling units after receiving said extant call for initiating a query to said calling instrument for updating said geographic location.

14. A system for handling emergency service calls placed from a calling instrument using a text messaging call format as recited in claim 12 wherein said at least one selected public safety answering position is configured for cooperating with said plurality of message handling units after receiving said extant call for initiating a query to said calling instrument for updating said geographic location.

15. A method for handling special number calls placed from a calling instrument using a text messaging format; the method comprising:

(a) providing a plurality of message handling units;
(b) coupling said plurality of message handling units in at least one communication network accessible by said calling instrument;
(c) operating at least one selected message handling unit of said plurality of message handling units to recognize and receive an extant call placed from said calling instrument in said text messaging call format using a special number via a first communication channel;
(d) operating said at least one selected message handling unit to establish a second communication channel with said calling unit for supporting text messaging communications;
(e) operating said plurality of message handling units cooperatively to effect querying said at least one communication network to ascertain a geographic location of said calling instrument substantially contemporaneously with said extant call;
(f) operating said plurality of message handling units cooperatively to use said geographic location for routing said extant call to at least one selected special number answering station coupled with said at least one communication network and situated generally proximate with said geographic location; and
(g) operating said at least one selected special number answering station cooperatively with said plurality of message handling units to establish two-way chat session communications between said calling instrument and said at least one selected special number answering station in said text messaging call format using said first communication channel and said second communication channel.

16. A method for handling special number calls placed from a calling instrument using a text messaging format as recited in claim 15 wherein said geographic location is provided to said at least one selected special number answering station substantially contemporaneously with said extant call.

17. A method for handling special number calls placed from a calling instrument using a text messaging format as recited in claim 16 wherein said at least one selected special number answering station is configured for cooperating with said plurality of message handling units after receiving said extant call for initiating a query to said calling instrument for updating said geographic location.

18. A method for handling special number calls placed from a calling instrument using a text messaging format as recited in claim 17 wherein said at least one communication network includes at least one converting unit coupled with at least one call route established between said calling instrument and said at least one selected special number answering station using selected message handling units of said plurality of message handling units; said at least one converting unit effecting conversion of calls from said text messaging format to at least one of an audio format and a visual format.

19. A method for handling special number calls placed from a calling instrument using a text messaging format as recited in claim 18 wherein said geographic location is provided to said at least one selected special number answering station substantially contemporaneously with said extant call.

20. A method for handling special number calls placed from a calling instrument using a text messaging format as recited in claim 18 wherein said at least one selected special number answering station is configured for cooperating with said plurality of message handling units after receiving said extant call for initiating a query to said calling instrument for updating said geographic location.

* * * * *